United States Patent [19]

Iijima

[11] Patent Number: 5,179,507
[45] Date of Patent: Jan. 12, 1993

[54] SOLID ELECTROLYTIC CAPACITOR EQUIPED WITH AN OPENING MECHANISM

[75] Inventor: Keiji Iijima, Tokyo, Japan

[73] Assignee: NEC Corporation, Japan

[21] Appl. No.: 859,823

[22] Filed: Mar. 30, 1992

[30] Foreign Application Priority Data

Mar. 28, 1991 [JP] Japan .................................. 3-64237

[51] Int. Cl.$^5$ ............................................ H01G 9/00
[52] U.S. Cl. ............................................ 361/534
[58] Field of Search .............................. 361/534–540; 29/25.03

[56] References Cited

U.S. PATENT DOCUMENTS

| 4,539,623 | 9/1985 | Irikura et al. | 361/540 |
| 4,763,228 | 8/1988 | Su | 361/534 |
| 4,935,848 | 6/1990 | Yamane et al. | 361/534 |

Primary Examiner—Donald A. Griffin
Attorney, Agent, or Firm—Ostrolenk, Faber, Gerb & Soffen

[57] ABSTRACT

In order to prevent an incorporated fuse in a solid electrolyte capacitor from being disconnected by mechanical stress after the attachment thereof and to maximize the capacity of the fuse-incorporated capacitor element by reducing the space for attachment of the fuse; a solid electrolyte capacitor equipped with an opening mechanism is structured in a manner such that a fuse connecting portion is constructed by a three layered structure in which an insulator is sandwiched between an anode terminal and a metal piece connected to an anode lead terminal, and a fuse is disposed in a cross-linking manner between the metal piece and the anode lead terminal. With this arrangement, according to the present inveniton, it is possible to prevent the fuse from being broken or disconnected from the connecting portions by mechanical impacts after connection of the incorporated fuse. Furthermore, it is possible to minimize the space for the attachment of the fuse, and thus fuse-incorporated capacitor element can be maximized in its capacity.

5 Claims, 1 Drawing Sheet

SOLID ELECTROLYTIC CAPACITOR EQUIPED WITH AN OPENING MECHANISM

BACKGROUND OF THE INVENTION

1. Field of the Invention

The present invention relates to a solid electrolytic capacitor equipped with an opening mechanism and more particularly relates to a solid electrolytic capacitor of this type having a fuse on its anode lead terminal side.

2. Description of the Prior Art

Conventionally, solid electrolyte capacitors in which a metal such as tantalum (Ta), niobium (Nb), aluminum or the like for performing a valve action is employed, are widely used in various electronic circuits, and the merit thereof has been known as having a small failure rate. The fault thereof, if it occurs, is often in a mode of a short circuit. When the short circuit happens, a large short-circuit current flows with the result that the capacitor element is heated and sometimes the capacitor element is burnt.

In order to protect other circuit components from this excessive short-circuit current, it is necessary to open the short circuit to cut off the failure mode. To deal with this, a fuse is generally used, and prior arts have been disclosed in Japanese Patent Application Laying-open No.66925/1989, etc. A conventional solid electrolyte capacitor equipped with an opening mechanism stated above has a fundamental structure as shown in FIG. 2. That is, a capacitor element 1 comprises a cathode layer 3 and an anode lead 2, and the cathode layer 3 is connected to a cathode lead terminal 5 with a conductive adhesive 8, whereas a metal piece which is welded to the anode lead 2 is cross-linked to an anode lead terminal 4 by way of a fuse 6. Further, the whole structure other than part of the lead terminals is covered by an encapsulating resin.

In the conventional solid electrolyte capacitor, cross-linkage of the anode lead terminal 4 with the metal piece 10 connected to the anode lead 2 is performed on the same plane by way of the fuse 6, and whereby causing drawbacks as follows:

(1) The metal piece 10 is arranged separately from the anode lead terminal 4, so that the fuse 6 may be broken or other connecting portions may be disconnected by mechanical stress or impacts after the fuse 6 being attached.

(2) The metal piece 10 and the anode lead terminal 4 are arranged on the same plane separately from each other, so that connecting them with the fuse 6 requires a large space, thus making it difficult to increase the capacity of the capacitor element 1 being incorporated in a limited outside dimension.

SUMMARY OF THE INVENTION

The present invention has been achieved in view of what is discussed above and it is an object of the present invention to provide a solid electrolyte capacitor equipped with an opening mechanism which is free from breakdown of the fuse or disconnection of other connecting portions, being caused by mechanical impacts after attachment of the fuse, and in which the capacity thereof can be maximized in a limited size by constructing a structure not to require a large space for the attachment of the fuse.

A solid electrolyte capacitor equipped with an opening mechanism comprises a capacitor element including a cathode layer and an anode lead; a cathode lead terminal connected to the cathode layer with a conductive adhesive, solder or the like; a metal being connected to the anode lead by welding; an anode lead terminal; an electric insulator being sandwiched between the metal piece and the anode lead terminal to form a three-layered structure; a fuse for cross-linking the metal piece with the anode lead terminal; and an encapsulating resin for covering these parts.

DETAILED DESCRIPTION OF PREFERRED EMBODIMENT

The present invention will be described in detail with reference to the accompanying drawings.

Figure 1:
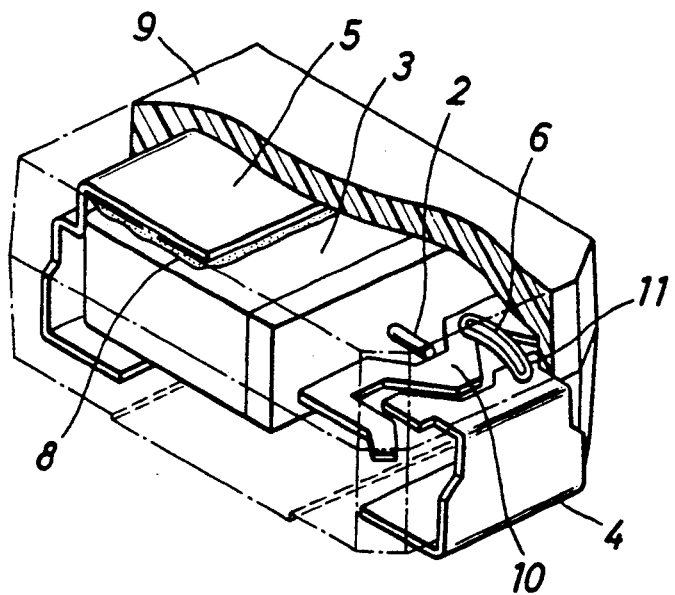
FIG. 1 is a perspective view showing the internal structure of an example of a conventional solid electrolyte capacitor equipped with an opening mechanism; and, FIG. 2 is a perspective view showing the internal structure of an embodiment of a solid electrolyte capacitor equipped with an opening mechanism according to the present invention.
Figure 2:
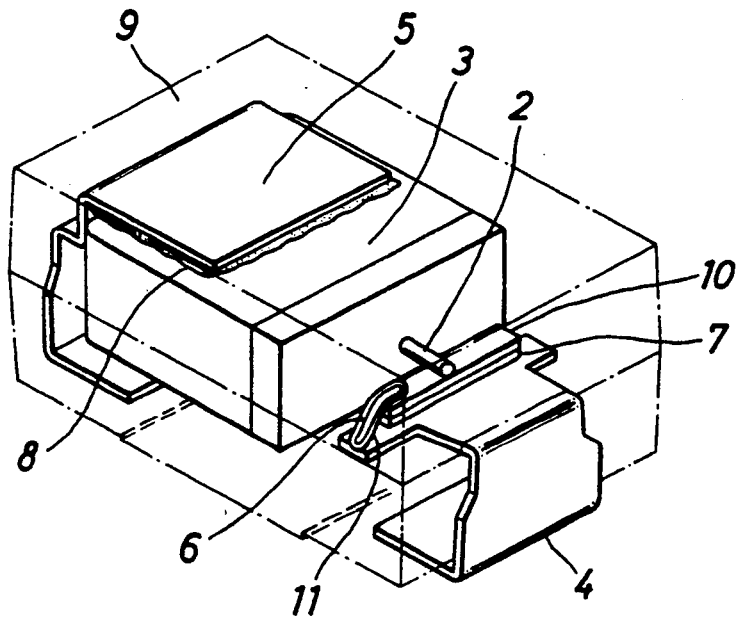

FIG. 1 is a perspective view showing an internal structure of an embodiment of a solid electrolyte cpapcitor equipped with an opening mechanism according to the present invention.

An anode lead 2 which is implanted on, a capacitor element 1 structured with tantalum, niobium, aluminum or the like, is connected by welding to a metal piece 10. A cathode lead terminal 5 is coated with a conductive adhesive 8 on one side thereof facing to the capacitor element 1, and the capacitor element 1 is arranged such that a cathode layer 3 thereof faces the adhesive-coated surface. Thereafter, the conductive adhesive 8 is hardened with heat to connect the cathode lead terminal 5 with the cathode layer 3.

Next, between the metal piece 10 connected to the anode lead 2 and an anode lead terminal 4 is inserted an insulator 7, such as glass-epoxy, polyimide or the like, having substantially the same size as the metal piece 10, to form a three-layered structure and is fixed with an adhesive such as epoxy or the like.

A fuse 6 is disposed in a cross-linking manner between the metal piece 10 and the anode lead terminal 4 by thermo-compression bonding, welding or other bonding. Then, in order to protect the fuse 6 from the mechanical stresses caused when the structure is encapsulated with a resin, a silicon resin 11 is coated to cover the fuse 6 and hardened with heat.

Then the whole structure, other than the external electrodes of the anode lead terminal 4 and the cathode lead terminal 5, is covered with an encapsulating resin 9 by way of transfer molding, resin potting or other methods. At last, the anode lead terminal 4 and the cathode lead terminal 5 are respectively formed into U-shape to thereby complete the product.

As described above, according to the present invention, an anode lead is welded to a metal piece, and the metal piece and anode lead terminal hold an insulator therebetween to form a three-layered structure, and a fuse is disposed in a cross-linking manner to this three-layered structural portion. As a result, the present invention can provide improved effects as follows, compared to the conventional arrangement in which a metal piece and an anode lead terminal are set separately on the same plane:

(1) Since the insulator is sandwiched between the metal piece to which the fuse is connected and the anode lead terminal, to form an integrated structure having three layers, the fuse can be readily connected and is hard to be taken off by the mechanical impact after the attachment, and thus it is possible to improve the reliability of the products.

(2) The space occupied by the attachment of the fuse can be reduced to about one-third as compared to the conventional structure. The resulting vacant space which is brought about by the reduction of the attachment space for the fuse can be allotted for the capacitor element to be enlarged. Consequently, it is possible to produce a capacitor in which a capacitor element having a capacity larger than that of the conventional one by approximately 30 to 50% can be incorporated into the same external dimension as the conventional capacitor.

What is claimed is:

1. A solid electrolyte capacitor equipped with an opening-mechanism comprising:
    a capacitor element including a cathode layer and an anode lead;
    a cathode lead terminal being connected electrically to said cathode layer on the far side of said anode lead of said capacitor element;
    a metal piece welded to said anode lead;
    an anode lead terminal holding an electric insulator together with said metal piece to form a three-layered structure;
    a fuse for electrically connecting said metal with said anode lead; and
    a resin sealing for encapsulating the whole configuration with said cathode lead terminal and said anode lead terminal being exposed.

2. The capacitor according to claim 1, wherein said cathode lead terminal is bent into a U-shape with two arm portions thereof being extended respectively along the side and bottom surfaces of the outer configuration of said capacitor; and said anode lead terminal is bent into another U-shape with two arm portions thereof being extended respectively along the side and bottom surfaces of the outer configuration of said capacitor.

3. The capacitor according to claim 2, wherein said fuse has one end connected to one end of said metal piece, and the other end connected to the side end of the upper arm of said anode lead terminal.

4. The capacitor according to claim 3, wherein said insulator is formed of a glass epoxy or polyimide.

5. The capacitor according to claim 1, wherein said fuse is covered with an elastic resin.

* * * * *